(12) United States Patent
Compadre et al.

(10) Patent No.: US 12,516,035 B2
(45) Date of Patent: Jan. 6, 2026

(54) TOCOPHEROL DERIVATIVES AND METHODS OF USE

(71) Applicants: BIOVENTURES, LLC, Little Rock, AR (US); THE UNITED STATES OF AMERICA AS REPRESENTED BY THE DEPARTMENT OF VETERANS AFFAIRS, Washington, DC (US)

(72) Inventors: Cesar Compadre, Little Rock, AR (US); Philip J. Breen, Little Rock, AR (US); Martin Hauer-Jensen, Little Rock, AR (US); Kottayil Varughese, Little Rock, AR (US); K. Sree Kumar, Rockville, MD (US)

(73) Assignees: BIOVENTURES, LLC, Little Rock, AR (US); THE UNITED STATES OF AMERICA AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 489 days.

(21) Appl. No.: 17/857,879

(22) Filed: Jul. 5, 2022

(65) Prior Publication Data

US 2022/0332692 A1    Oct. 20, 2022

Related U.S. Application Data

(63) Continuation of application No. 15/969,601, filed on May 2, 2018, now abandoned, which is a continuation of application No. 13/701,630, filed as application No. PCT/US2011/038933 on Jun. 2, 2011, now abandoned.

(60) Provisional application No. 61/350,740, filed on Jun. 2, 2010.

(51) Int. Cl.
    *C07D 311/72* (2006.01)
    *C07D 311/58* (2006.01)

(52) U.S. Cl.
    CPC .......... *C07D 311/72* (2013.01); *C07D 311/58* (2013.01)

(58) Field of Classification Search
    CPC .................................................. C07D 311/72
    See application file for complete search history.

(56) References Cited

U.S. PATENT DOCUMENTS

| | | |
|---|---|---|
| 4,168,271 A | 9/1979 | Cardenas et al. |
| 5,114,957 A | 5/1992 | Hendler et al. |
| 5,336,485 A | 8/1994 | Fariss |
| 5,591,772 A | 1/1997 | Lane et al. |
| 5,606,080 A | 2/1997 | Ogata et al. |
| 5,821,264 A | 10/1998 | Lane et al. |
| 5,827,878 A | 10/1998 | Makishima et al. |
| 5,919,818 A | 7/1999 | Lane et al. |
| 5,929,057 A | 7/1999 | Makishima et al. |
| 5,990,322 A | 11/1999 | Lee et al. |
| 6,133,312 A | 10/2000 | Elson |
| 6,143,770 A | 11/2000 | Lane et al. |
| 6,204,290 B1 | 3/2001 | Lane et al. |
| 6,239,171 B1 | 5/2001 | Lane et al. |
| 6,350,453 B1 | 2/2002 | Tan et al. |
| 6,410,752 B1 | 6/2002 | Kim et al. |
| 6,417,223 B1 | 7/2002 | Sanders et al. |
| 6,683,194 B2 | 1/2004 | Zhang et al. |
| 6,716,873 B1 | 4/2004 | Keramidas et al. |
| 6,770,672 B1 | 8/2004 | Sanders et al. |
| 7,105,686 B2 | 9/2006 | Giraudi et al. |
| 7,642,064 B2 | 1/2010 | Bieniarz et al. |
| 8,044,161 B2 | 10/2011 | Tiitinen et al. |
| 9,309,547 B2 | 4/2016 | Zheng |
| 2005/0037102 A1 | 2/2005 | Tan et al. |
| 2009/0036354 A1 | 2/2009 | Gavin et al. |
| 2009/0041870 A1 | 2/2009 | Tan et al. |
| 2010/0003716 A1 | 1/2010 | Cervin et al. |
| 2010/0036079 A1 | 2/2010 | Tiitinen et al. |
| 2011/0293753 A1 | 12/2011 | Bellafiore et al. |
| 2015/0087033 A1 | 3/2015 | Zheng |

FOREIGN PATENT DOCUMENTS

| | | |
|---|---|---|
| WO | WO 1993/009777 | 5/1993 |
| WO | WO 2000/016772 | 3/2000 |
| WO | WO 2001/058889 | 8/2001 |
| WO | WO 2003/039461 | 5/2003 |
| WO | WO 2011/001258 | 1/2011 |
| WO | WO 2011/150312 | 12/2011 |

(Continued)

OTHER PUBLICATIONS

Berbee, M. et al., "γ-Tocotrienol ameliorates intestinal radiation injury and reduces vascular oxidative stress after total-body irradiation by an HMG-COA reductase-dependent mechanism," (2009) Radiation Research 171:596-605.
Ghosh, S.P et al., "Gamma-tocotrienol, a tocol antioxidant as a potent radioprotector," (2009) Int. J. Radiat. Biol. 85(7):598-606.
Ghosh, S.P. et al., "Chemistry of tocotrienols," (2009) Tocotrienols: Vitamin E beyond tocopherols, CRC Press, Edited by Ronald Ross Watson and Victor R. Preedy, 7:85-96.
Kumar, K. S. et al., "Gamma-tocotrienol: Potential as a countermeasure against radiological threat," (2009) Tocotrienols: Vitamin E beyond tocopherols, CRC Press, Edited by Ronald Ross Watson and Victor R. Preedy, 27:379-398.

(Continued)

*Primary Examiner* — Golam M Shameem
(74) *Attorney, Agent, or Firm* — Quarles & Brady, LLP (57) ABSTRACT

Tocol derivative compounds, compositions comprising these tocol derivatives and methods of using the tocol derivatives are provided herein. Specifically the tocol derivatives have a partially unsaturated hydrocarbon tail and are thus distinct from the tocopherols. The hydrocarbon tails do not have a trans carbon-carbon double bond in the second isoprene unit of the hydrocarbon tail and are distinct from the tocotrienols. The compounds are expected to allow improved interaction with the α-tocopherol transfer protein receptor than the tocotrienols and better bioactivity than the tocopherols.

6 Claims, 4 Drawing Sheets

(56) References Cited

FOREIGN PATENT DOCUMENTS

| WO | WO 2011/153353 | 12/2011 |
| WO | WO 2013/176745 | 11/2013 |

OTHER PUBLICATIONS

International Search Report and Written Opinion for International Application No. PCT/US2011/038933, dated Sep. 12, 2011 (11 pages).

International Search Report and Written Opinion for International Application No. PCT/US2013/030862, dated May 28, 2013 (20 pages).

Leth, T. et al., "Biological activity of Vitamin E compounds and natural materials by the resorption-gestation test, and chemical determination of the Vitamin E activity in foods and feeds," (1977) J. Nutr. 107:2236-2243.

Panagabko, C. et al., "Ligand specificity in the CRAL-TRIO protein family," (2003) Biochem. 42:6467-6474 (Abstract).

International Search Report and Written Opinion for International Application No. PCT/US2014/0055657, dated Dec. 22, 2014 (10 pages).

Office Action for U.S. Appl. No. 14/402,792, dated Aug. 5, 2015 (11 pages).

Office Action for U.S. Appl. No. 13/701,630, dated Mar. 10, 2014 (14 pages).

Office Action for U.S. Appl. No. 13/701,630, dated Dec. 31, 2014 (20 pages).

Office Action for U.S. Appl. No. 13/701,630, dated Aug. 12, 2015 (21 pages).

Office Action for U.S. Appl. No. 13/701,630, dated Jun. 1, 2016 (24 pages).

Office Action for U.S. Appl. No. 13/701,630, dated Jan. 10, 2017 (9 pages).

Office Action for U.S. Appl. No. 13/701,630, dated Nov. 2, 2017 (19 pages).

Puah, C.W. et al., "The effect of physical refining on palm vitamin E (tocopherol, tocotrienol and tocomonoenol)" 2007 American Journal of Applied Sciences 4(6), 374-377.

Rammell, C.G. et al., (AN 1985:467656, CAPLUS DN103:67656, original reference No. 103:10829a, 10832a, Separation of tocols by HPLC on an amino-cyano polar phase column, Journal of Liquid Chromatography (1985), 8(4), 707-717.

Odinokov, V. et al., "Synthesis of α-tocopherol (vitamin E), vitamin K1-chromanol, and their analogs in the presence of aluminosilicate catalysts Tseokar-10 and Pentasil" 2003 ARKIVOC 13:101-118.

Buss, A.W. "Diastereoselective synthesis of alpha-tocopherol" Inaugural dissertation Basel, Nov. 11, 2008.

TOCOPHEROL DERIVATIVES AND METHODS OF USE

CROSS-REFERENCE TO RELATED APPLICATIONS

This patent application is a continuation of U.S. patent application Ser. No. 13/701,630, filed Jan. 24, 2013, which is a national stage filing under 35 U.S.C. 371 of International Application No. PCT/US2011/038933, filed Jun. 2, 2011 which claims the benefit of priority of U.S. Provisional Patent Application No. 61/350,740, filed Jun. 2, 2010, all of which are incorporated herein by reference in their entireties.

INTRODUCTION

Vitamin E is composed of eight naturally occurring tocols. Four are tocopherols, which possess a saturated hydrocarbon tail, and four are tocotrienols, which possess three trans double bonds in the hydrocarbon tail. The tocols are known to have beneficial health effects when provided as a dietary supplement. Efficient transport out of the liver is necessary for the tocols to deliver the beneficial health effects. The tocols are transported out of the liver and into the blood stream by a protein called αTTP (tocopherol transfer protein). Some tocols, specifically the tocopherols, are more efficiently transported out of the liver and into the blood stream than the tocotrienols and have a longer half-life in the body which allows for decreased doses and possibly increased biological activity.

SUMMARY

The tocotrienols have recently been shown to have some beneficial health effects not seen with the tocopherols. Provided herein are tocol derivatives with modifications to the hydrocarbon tail to allow more efficient binding and uptake of tocols with unsaturated hydrocarbon tails by the αTTP receptor. The derivatives are called tocoflexols to indicate the increased flexibility of the hydrocarbon tail as compared to tocotrienols and differentiate this class of compounds from the tocopherols and tocotrienols. Tocopherol and tocotrienol derivatives with one to three double bonds in the hydrocarbon tail are described herein.

In one aspect, tocol derivative compounds with a chroman group and a hydrocarbon tail having three isoprene units are described herein. The hydrocarbon tail is distinct from that of tocopherol and tocotrienol in that at least one isoprene unit is unsaturated, suitably between carbon 2 and 3 of the isoprene unit and the second isoprene unit in the hydrocarbon tail does not include a trans carbon carbon double bond.

In another aspect, the compounds described herein have formula (I):

(I)

or a salt thereof, wherein $R^1$, $R^3$, $R^4$ and $R^5$ are each independently —H, halogen, —OH, —OCH$_3$, or a branched or unbranched, substituted or unsubstituted, saturated or unsaturated $C_1$-$C_{20}$ alkyl; $R^2$ is an ester, —OH, —NHR$^6$, —CO$_2$H, C(R$^6$)$_2$CO$_2$H or a branched or unbranched, substituted or unsubstituted, saturated or unsaturated $C_1$-$C_6$ alkyl; $R^6$ is —H, halogen, —OH, or a branched or unbranched, substituted or unsubstituted, saturated or unsaturated $C_1$-$C_{20}$ alkyl; Y is O, S or NH; and Z is a hydrocarbon side chain having 1 to 3 carbon-carbon double bonds represented by formula (II):

(II)

wherein the numerals represent the numbering of the carbons in the chain, wherein the dotted lines between carbons 1', 2', 3', 4' and 16', and between 15', 8', 9', 10', 11', 12', 13', and 14' represent a position for an optional carbon-carbon bond and the dotted line between carbons 7' and 8' represent a single bond, a cis carbon-carbon double bond or a cyclopropyl group including carbon 7' and 8' and a third carbon that is not shown in the formula.

In one aspect, the compounds have a chroman head group of any of the tocol derivatives and a partially unsaturated hydrocarbon tail with a carbon-carbon double bond between carbons 11' and 12' or alternatively between any of the carbons in the third isoprene unit. In another aspect, the compounds have a hydrocarbon tail with two carbon-carbon double bonds. In one embodiment, the carbon-carbon double bonds are between carbons 15', 8', 9', 10', 11', 12', 13', and 14' and at least one of carbons 1'-2', 2'-3', 3'-4', 7'-8' and 4'-16'. In yet another aspect, the compounds have a hydrocarbon tail with three carbon-carbon double bonds. In one embodiment, the carbon-carbon double bonds are between at least one of carbons 15', 8', 9', 10', 11', 12', 13', and 14' and between carbons 7' and 8' and one of carbons 1'-2', 2'-3', 3'-4', and 4'-16'. In still another embodiment, the hydrocarbon tail has a double bond between at least one of carbons 15', 8', 9', 10', 11', 12', 13', and 14' and between one of carbons 1'-2', 2'-3', 3'-4', and 4'-16' and contains a cyclopropyl group including carbons 7' and 8' and a carbon 17' not shown in formula II.

In still another aspect, methods of treating a subject with a condition are provided. The methods include administering an effective amount of at least one of the described compounds to the subject to ameliorate the condition. The subject may be in need of treatment with an antioxidant, an anti-inflammatory agent, an immunoregulatory agent, an anti-thromobotic agent, an anti-atherogenic agent, a hypocholesterolemic agent or an HMG-CoA reductase inhibitor. The subject may have a condition selected from radiation exposure, cancer, cardiovascular disease including but not limited to coronary artery disease, decreasing lipoprotein levels, decreasing cholesterol levels, decreasing triglycerides, age-related macular degeneration, cataracts, glaucoma, chronic pain, chronic fatigue syndrome, fever, edema, diabetes mellitus, signs of aging, rheumatoid diseases, septic shock, and Alzheimer's disease.

DETAILED DESCRIPTION

Provided herein are tocol derivatives with modifications to the hydrocarbon tail to allow more efficient binding and uptake by the αTTP receptor and methods of using these compounds. The derivatives are called tocoflexols to indicate the increased flexibility of the hydrocarbon tail relative to the tocotrienols and differentiate this class of compounds from the tocopherols and tocotrienols. Tocopherol and tocotrienol derivatives with one to three double bonds in the hydrocarbon tail are described herein.

Tocol derivative compounds with a chroman group and a hydrocarbon tail having three isoprene units are described herein. The chroman group has the basic structure shown in formula I. Many alterations to the chroman head group of the tocols have been described elsewhere and are known to those of skill in the art. The chroman head group of any tocol may be used to generate the compounds descried herein. The hydrocarbon tail is distinct from that of tocopherol in that at least one isoprene unit is unsaturated. Suitably the double bond is between carbon 2 and 3 of the isoprene unit as shown below. The hydrocarbon tail is also distinct from that of the tocotrienols because the second (middle) isoprene unit in the hydrocarbon tail does not include a trans carbon-carbon double bond.

Suitably, at least one of the isoprene units has a double bond. Suitably, the double bond is between carbons 2 and 3 of the isoprene unit as shown by the dotted line in the formula above. Suitably, the third isoprene unit (the farthest from the chroman head group) has a carbon-carbon double bond between carbon 2 and 3. Suitably the hydrocarbon tail has a cis carbon-carbon double bond between carbons 2 and 3 of the second or middle isoprene unit. Suitably the compound has a carbon-carbon double bond between carbon 2 and 3 of the third isoprene unit and a cis carbon-carbon double bond between carbons 2 and 3 of the second or middle isoprene unit. Alternatively, the compound may have a cyclopropyl group involving carbons 2 and 3 of the second or middle isoprene unit and an additional carbon that is not part of the basic isoprene unit. This compound may also have a carbon-carbon double bond between carbons 2 and 3 of the third isoprene unit. Alternatively, the second isoprene unit of the hydrocarbon tail may be saturated and the first or first and third isoprene units may be unsaturated.

As described in the Examples, the inventors found that in order to efficiently bind to the αTTP receptor the hydrocarbon tail of tocols must be flexible and able to fold and bend. Tocotrienols, because of the unsaturated hydrocarbon tail, do not bind as efficiently to αTTP and have lower bioavailability than tocopherols. The hydrocarbon tail of the tocoflexols of the present invention may be folded such that the Torsion angle between carbon 4 of the first isoprene unit and carbons 1, 2, and 3 of the second isoprene unit is about 61.0° and the Torsion angle between carbons 1, 2, 3, and 4 of the second isoprene unit is about 58.4°. Suitably the hydrocarbon tail is flexible and can adopt conformations with Torsion angles between 30° and 90°, suitably between 45° and 75°, suitably between 50° and 70°, suitably between 53° and 65° at these positions.

Tocopherol and tocotrienol derivatives having one to three unsaturated carbon-carbon bonds on the hydrocarbon tail are provided herein. The compounds provided herein may have the following structural formula:

or a salt thereof, wherein $R^1$, $R^3$, $R^4$ and $R^5$ are each independently —H, halogen, —OH, —OCH$_3$, or a branched or unbranched, substituted or unsubstituted, saturated or unsaturated $C_1$-$C_{20}$ alkyl; $R^2$ is an ester, —OH, —NHR$^6$, —CO$_2$H, —C(R$^6$)$_2$CO$_2$H or a branched or unbranched, substituted or unsubstituted, saturated or unsaturated $C_1$-$C_6$ alkyl or hydroxyalkyl; $R^6$ is —H, halogen, —OH, or a branched or unbranched, substituted or unsubstituted, saturated or unsaturated $C_1$-$C_{20}$ alkyl; Y is O, S or NH; and Z is a hydrocarbon side chain having 1 to 3 carbon-carbon double bonds represented by formula (II).

The numerals represent the numbering of the carbons in the chain. The dotted lines between carbons 1', 2', 3', 4' and 16', and between 15', 8', 9', 10', 11', 12', 13', and 14' represent a position for an optional carbon-carbon double bond and the dotted line between carbon 7' and 8' represent a single bond, an optional cis carbon-carbon double bond or a cyclopropyl group including both carbon 7' and 8' and an additional carbon 17' not shown in this formula.

Figure 1:
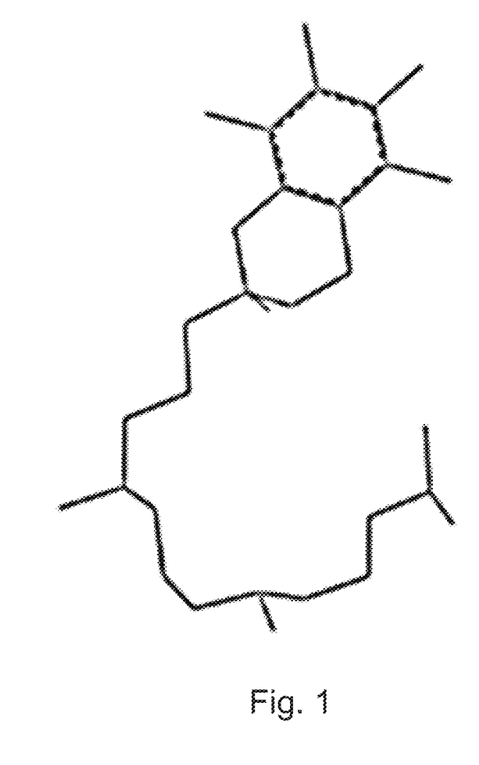
FIG. 1 is a schematic of RRR-α-tocopherol as it would appear when bound to the α-TTP receptor.
Figure 2:
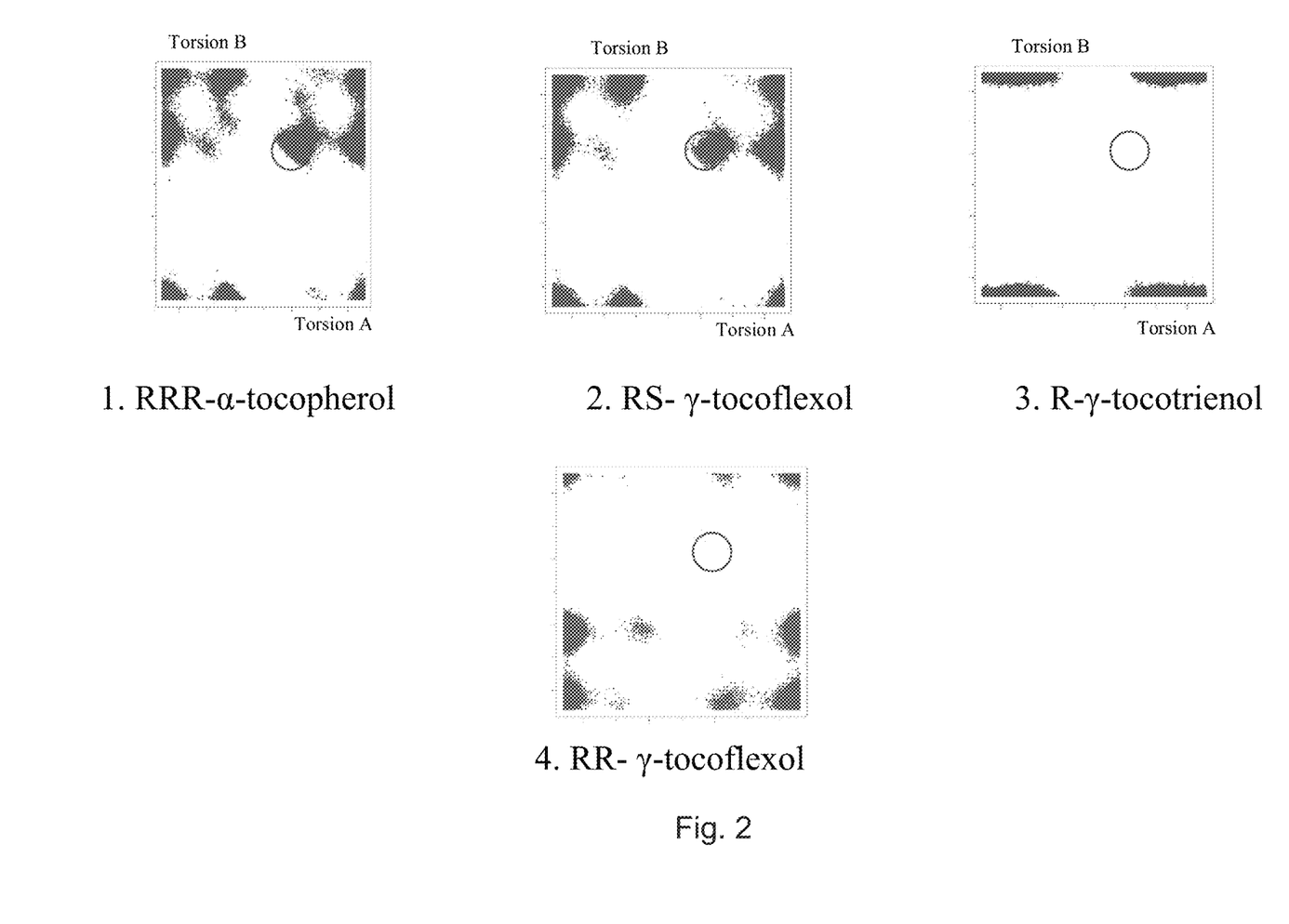
FIG. 2 is a schematic of the in silico analysis of the Torsion angles A and B for tocopherol, tocotrienol and the RS and RR configuration of tocoflexol compounds of the invention. The circle represents a key contact between the TTP receptor and the tocol.

The compound may have the Torsion angles described above such that the Torsion A angle between carbons 5', 6', 7', and 8' of the hydrocarbon tail of formula II is about 61.0° and the Torsion B angle between carbons 6', 7', 8', and 9' of the hydrocarbon tail of formula II is about 58.4°. Suitably the hydrocarbon tail is flexible and can adopt conformations with Torsion angles between 30° and 90°, suitably between 45° and 75°, suitably between 50° and 70°, suitably between 53° and 65° at these positions. A tocol compound having these torsion angles is depicted in FIG. 1. In a straight line drawing the torsion angles are depicted as follows:

The compounds have a hydrocarbon tail with a carbon-carbon double bond. The double bond may be between one of carbons 15', 8', 9', 10', 11', 12', 13', and 14', suitably the double bond is between carbons 11' and 12'. The compounds may have a hydrocarbon tail with two or three carbon-carbon double bonds. The carbon-carbon double bonds may be between at least one of carbons 15', 8', 9', 10', 11', 12', 13', and 14', suitably carbons 11' and 12' and at least one of carbons 1'-2', 2'-3', 3'-4', 4'-16', 8'-15', 8'-9' or 9'-10'. The hydrocarbon tails do not have a carbon-carbon double bond between carbons 5'-6', 6'-7' or 7'-8' in the trans configuration. In another aspect, the compounds have a hydrocarbon tail with two carbon-carbon double bonds. In one embodiment, the carbon-carbon double bonds are between at least one of carbons 15', 8', 9', 10', 11', 12', 13', and 14', suitably carbons 11' and 12' and at least one of carbons 1'-2', 2'-3', 3'-4', 7'-8' (in cis) and 4'-16'. In yet another aspect, the compounds have a hydrocarbon tail with three carbon-carbon double bonds. In one embodiment, the carbon-carbon double bonds are between at least one of carbons 15', 8', 9', 10', 11', 12', 13', and 14', suitably carbons 11' and 12', and 7'-8' (in cis) and one of carbons 1'-2', 2'-3', 3'-4', and 4'-16'. In still another embodiment, the hydrocarbon tail has a double bond between at least one of carbons 15', 8', 9', 10', 11', 12', 13', and 14', suitably carbons 11' and 12' and between one of carbons 1'-2', 2'-3', 3'-4', and 4'-16' and contains a cyclopropyl group including carbons 7' and 8' and a carbon 17' not shown in formula II. The hydrocarbon tail with the optional cyclopropyl group may have one of the following configurations with the carbon-double bond shown between carbons 3' and 4' as an optional double bond:

The hydrocarbon tails described herein may have at least one stereocenter. Thus the compounds of the invention may be present as a racemic mixture of compounds or stereoisomers. As shown in FIG. 2 and described further in the examples, certain isomers may be more effective in terms of binding and transport by the αTTP receptor or may have different or distinct bioactivity, bioavailability or pharmacokinetics. The RS configuration is expected to bind and be transported more efficiently than other isomers. Thus preparation and isolation of the most effective stereoisomers may result in relative pure preparations. If either isomer is in enantiomeric excess of over 50%, the compound is suitably over 80% in the RS structure. Suitably, the compound is over 80%, 85%, 90%, 95%, 98%, 99% a single stereoisomer, such as the RS stereoisomer.

The chroman head group of the tocols of formula I may be any of those known or readily available to those of skill in the art. In some embodiments, $R^2$ is an —OH. In other embodiments $R^2$ is an ester. If $R^2$ is an ester it may be an ester selected from —O(CO)CH$_3$, —O(CO)heterocyclic, O(CO)carbocyclic, —O(CO)(R$^7$)COOH, —O(CO)R$^8$, wherein $R^7$ is selected from a branched or unbranched, saturated or unsaturated, substituted or unsubstituted $C_1$-$C_{20}$ alkyl and $R^8$ is selected from —H, and a branched or unbranched, saturated or unsaturated, substituted or unsubstituted $C_1$-$C_{20}$ alkyl. Suitably $R^2$ is —NHR$^6$, —CO$_2$H, —C(R$^6$)$_2$CO$_2$H or a branched or unbranched, substituted or unsubstituted, saturated or unsaturated $C_1$-$C_6$ alkyl or hydroxyalkyl. $R^6$ is suitably a —H, —OH or —CH$_3$.

In other embodiments, Y is an —O—. $R^5$ is suitably either a —H or a —CH$_3$. $R^1$, $R^3$ and $R^4$ are suitably a $C_1$-$C_6$ branched or unbranched, saturated or unsaturated, substituted or unsubstituted alkyl. In one embodiment, $R^1$, $R^3$, $R^4$ and $R^5$ are selected from —H and —CH$_3$, $R^2$ is —OH or an ester, Y is —O—, and the hydrocarbon tail (Z) has at least a double bond between carbons 11' and 12'. In one embodiment, $R^5$ is —H. In one embodiment, $R^1$, $R^3$ and $R^4$ are all CH$_3$. In one embodiment, $R^3$ and $R^4$ are CH$_3$ and $R^1$ is H. In another embodiment, $R^1$ and $R^4$ are CH$_3$ and $R^3$ is H. In another embodiment, $R^1$, $R^3$ and $R^4$ are H.

In one set of embodiments, Y is —O—; $R^5$ is —CH$_3$; $R^2$ is —OH and Z is selected from the hydrocarbon tail of formula II wherein there is a single double bond between the carbons labeled 11' and 12', a single double bond between the carbons labeled 3' and 4' or both of these double bonds. In these embodiments, $R^1$, $R^3$ and $R^4$ may be independently selected from —H or —CH$_3$. In one of these embodiments, $R^1$ is —CH$_3$, $R^3$ is —CH$_3$ and $R^4$ is —CH$_3$. In another one of these embodiments, $R^1$ is —CH$_3$, $R^3$ is —H and $R^4$ is —CH$_3$. In another one of these embodiments, $R^1$ is —H, $R^3$ is —CH$_3$ and $R^4$ is —CH$_3$. In another one of these embodiments, $R^1$ is —H, $R^3$ is —H and $R^4$ is —CH$_3$.

Each R group is independently selected and may be combined in any manner and with any of the hydrocarbon tails described herein. One exemplary embodiment of the compounds of the invention is as shown below:

"Substituted" means that one or more of the hydrogen atoms bonded to carbon atoms in the chain or ring have been replaced with other substituents. Suitable substituents include monovalent hydrocarbon groups including alkyl groups such as methyl groups and monovalent heterogeneous groups including alkoxy groups such as methoxy groups. "Unsubstituted" means that the carbon chain or ring contains no other substituents other than carbon and hydrogen.

"Branched" means that the carbon chain is not simply a linear chain. "Unbranched" means that the carbon chain is a linear carbon chain.

"Saturated" means that the carbon chain or ring does not contain any double or triple bonds. "Unsaturated" means that the carbon chain or ring contains at least one double bond. An unsaturated carbon chain or ring may include more than one double bond.

"Heterogeneous group" means a saturated or unsaturated chain of non-hydrogen member atoms comprising carbon atoms and at least one heteroatom.

"Hydrocarbon group" means a chain of 1 to 25 carbon atoms, suitably 1 to 12 carbon atoms, more suitably 1 to 10 carbon atoms, and most suitably 1 to 8 carbon atoms. Hydrocarbon groups may have a linear or branched chain structure. Suitably the hydrocarbon groups have one branch.

"Carbocyclic group" means a saturated or unsaturated hydrocarbon ring. Carbocyclic groups are not aromatic. Carbocyclic groups are monocyclic or polycyclic. Polycyclic carbocyclic groups can be fused, spiro, or bridged ring systems. Monocyclic carbocyclic groups contain 4 to 10 carbon atoms, suitably 4 to 7 carbon atoms, and more suitably 5 to 6 carbon atoms in the ring. Bicyclic carbocyclic groups contain 8 to 12 carbon atoms, preferably 9 to 10 carbon atoms in the rings.

"Heteroatom" means an atom other than carbon e.g., in the ring of a heterocyclic group or the chain of a heterogeneous group. Preferably, heteroatoms are selected from the group consisting of sulfur, phosphorous, nitrogen and oxygen atoms. Groups containing more than one heteroatom may contain different heteroatoms.

"Heterocyclic group" means a saturated or unsaturated ring structure containing carbon atoms and 1 or more heteroatoms in the ring. Heterocyclic groups are not aromatic. Heterocyclic groups are monocyclic or polycyclic. Polycyclic heteroaromatic groups can be fused, spiro, or bridged ring systems. Monocyclic heterocyclic groups contain 4 to 10 member atoms (i.e., including both carbon atoms and at least 1 heteroatom), suitably 4 to 7, and more suitably 5 to 6 in the ring. Bicyclic heterocyclic groups contain 8 to 18 member atoms, suitably 9 or 10 in the rings.

Methods of making the compounds described herein are provided in the Examples. The compounds may be synthesized using conventional chemical technologies available to those skilled in the art. Salts of the compounds described herein are also provided. Suitably the salts are pharmaceutically acceptable. Acceptable salts of the compounds include, but are not limited to hydrochloride, hydrobromide, hydroiodide, nitrate, sulfate, bisulfate, phosphate, acid phosphate.

The compounds described have enhanced binding to the α-TTP receptor and enhanced transport out of the liver and into the circulation after administration to a subject. The enhanced transport is expected to lead to enhanced biological activity of the compounds as compared to tocotrienol after administration to a subject. The elimination half-life from the subject is also expected to be enhanced. This enhancement of uptake into the blood stream combined with decreased clearance from the body may result in increased effectiveness of administration of the compound or may allow for the therapeutically effective dose of the compounds described herein to be lower than that of tocotrienol or other tocols. The subject may be any mammal, including but not limited to a human, mouse, or domesticated animal.

In addition, the compounds may have other activities in addition to increased receptor mediated uptake into the blood stream. For example the hydrocarbon tail may allow farnesyl recognition or confer HMGCoA reductase inhibition activity. Thus the hydrocarbon tail composition may also affect the bioactivity of the compound.

The compounds may be used to make pharmaceutical compositions. Pharmaceutical compositions comprising the compound of formula (I) or any of the compounds described above and a pharmaceutically acceptable carrier are provided. A pharmaceutically acceptable carrier is any carrier suitable for in vivo administration. Examples of pharmaceutically acceptable carriers suitable for use in the composition include, but are not limited to, water, buffered solutions, glucose solutions, oil-based or bacterial culture fluids. Additional components of the compositions may suitably include, for example, excipients such as stabilizers, preservatives, diluents, emulsifiers and lubricants. Examples of pharmaceutically acceptable carriers or diluents include stabilizers such as carbohydrates (e.g., sorbitol, mannitol, starch, sucrose, glucose, dextran), proteins such as albumin or casein, protein-containing agents such as bovine serum or skimmed milk and buffers (e.g., phosphate buffer). Especially when such stabilizers are added to the compositions, the composition is suitable for freeze-drying or spray-drying. The composition may also be emulsified.

The compounds described herein may be used to treat a subject with a condition selected from radiation exposure, cancer, cardiovascular disease including but not limited to coronary artery disease, decreasing lipoprotein levels, decreasing cholesterol levels, decrease triglyceride levels and the like, age-related macular degeneration, cataracts, glaucoma, chronic pain, chronic fatigue syndrome, fever, edema, diabetes mellitus, signs of aging, rheumatoid diseases, septic shock, or Alzheimer's disease. In the case of radiation exposure, the compounds may be delivered as a radioprotective agent to a subject prior to potential exposure to radiation, such as to a patient receiving radiation therapy, or a person working with or cleaning up radiation. The compounds may also be given after radiation exposure as a radiomitigator, such as after an accident involving the release of radiation.

Treatment of a condition includes but is not limited to, prophylaxis of symptoms or indicators of the condition, reduction in disease severity, or reversal, reduction or slowing in disease progression as compared to an untreated subject. The compounds described herein may be used to treat subjects in need of treatment with an antioxidant, an anti-inflammatory, immunoregulatory, antithrombotic, antiatherogenic, hypocholesterolemic or an HMG-CoA reductase inhibitor.

In addition, the compounds may be useful to increase the feed conversion efficiency of domesticated animals including livestock. Combination therapy with a known antioxidant, anti-inflammatory or HMG-CoA reductase inhibitor may result in increased effectiveness of the combination treatment as compared to treatment with either compound alone.

The compounds described herein may be administered by any means known to those skilled in the art, including, but not limited to, oral, topical, intranasal, intraperitoneal, parenteral, intravenous, intramuscular, or subcutaneous. Thus the compounds may be formulated as an ingestable, injectable, topical or suppository formulation. The compounds may also be delivered with in a liposomal or time-release vehicle. Administration of the compounds to a subject in accordance with the invention appears to exhibit beneficial effects in a dose-dependent manner. Thus, within broad limits, administration of larger quantities of the compounds is expected to achieve increased beneficial biological effects than administration of a smaller amount. Moreover, efficacy is also contemplated at dosages below the level at which toxicity is seen.

It will be appreciated that the specific dosage administered in any given case will be adjusted in accordance with the compound or compounds being administered, the disease to be treated or inhibited, the condition of the subject, and other relevant medical factors that may modify the activity of the compound or the response of the subject, as is well known by those skilled in the art. For example, the specific dose for a particular subject depends on age, body weight, general state of health, diet, the timing and mode of administration, the rate of excretion, medicaments used in combination and the severity of the particular disorder to which the therapy is applied. Dosages for a given patient can be determined using conventional considerations, e.g., by customary comparison of the differential activities of the compound of the invention and of a known agent such as tocopherol, such as by means of an appropriate conventional pharmacological or prophylactic protocol.

The maximal dosage for a subject is the highest dosage that does not cause undesirable or intolerable side effects. The number of variables in regard to an individual prophylactic or treatment regimen is large, and a considerable range of doses is expected. The route of administration will also impact the dosage requirements. It is anticipated that dosages of the compound will reduce symptoms of the condition at least 10%, 20%, 30%, 40%, 50%, 60%, 70%, 80%, 90% or 100% compared to pre-treatment symptoms or symptoms is left untreated. It is specifically contemplated that pharmaceutical preparations and compositions may palliate or alleviate symptoms of the disease without providing a cure, or, in some embodiments, may be used to cure the disease or disorder.

Suitable effective dosage amounts for administering the compounds may be determined by those of skill in the art, but typically range from about 1 microgram to about 100,000 micrograms per kilogram of body weight weekly, although they are typically about 1,000 micrograms or less per kilogram of body weight weekly. Like other vitamin E compounds, large doses may be required for therapeutic effect and toxicity of the compounds is likely low. In some embodiments, the effective dosage amount ranges from about 10 to about 10,000 micrograms per kilogram of body weight weekly. In another embodiment, the effective dosage amount ranges from about 50 to about 5,000 micrograms per kilogram of body weight weekly. In another embodiment, the effective dosage amount ranges from about 75 to about 1,000 micrograms per kilogram of body weight weekly. The effective dosage amounts described herein refer to total amounts administered, that is, if more than one compound is administered, the effective dosage amounts correspond to the total amount administered. The compound can be administered as a single dose or as divided doses. For example, the composition may be administered two or more times separated by 4 hours, 6 hours, 8 hours, 12 hours, a day, two days, three days, four days, one week, two weeks, or by three or more weeks.

The following examples are meant only to be illustrative and are not meant as limitations on the scope of the invention or of the appended claims. All references cited herein are hereby incorporated by reference in their entireties.

EXAMPLES

Predicted Binding of Tocoflexols to αTTP

In silico analysis of the αTTP receptor interaction with αTTP demonstrated that the hydrocarbon tail of tocopherol folds over in order to efficiently bind the receptor as shown in FIG. 1. FIG. 1 demonstrates that the hydrocarbon tail must fold at two torsion points. Torsion angle A is suitably about 61° and Torsion B is suitably at about 58.4°. Thus tocols with a flexible tail capable of conforming to these angles are contemplated. The central location of the torsion is shown in the drawing below.

The heat map of the interaction between various tocols and the αTTP receptor is shown in FIG. 2. The circled area on the heat map shows the key interaction distinction between RRR-α-tocopherol and R-γ-tocotrienol. The heat map for RS-γ-tocoflexol is quite similar to that of tocopherol and thus binding to αTTP receptor is expected to be similar to that of tocopherol. The heat map for RR-γ-tocoflexol lacks this key predicted interaction and thus is expected to bind αTTP less efficiently.

Synthesis of Compounds of Formula I

Compound 1

Compound 1 is synthesized by a reaction between a chiral chromanyl group and C15 alkyl chain built as shown below.

Chromanol Head (I) Preparation

Tocoflexol Tail (II) Preparation

Tocoflexol Synthesis Final Step

Figure 3:
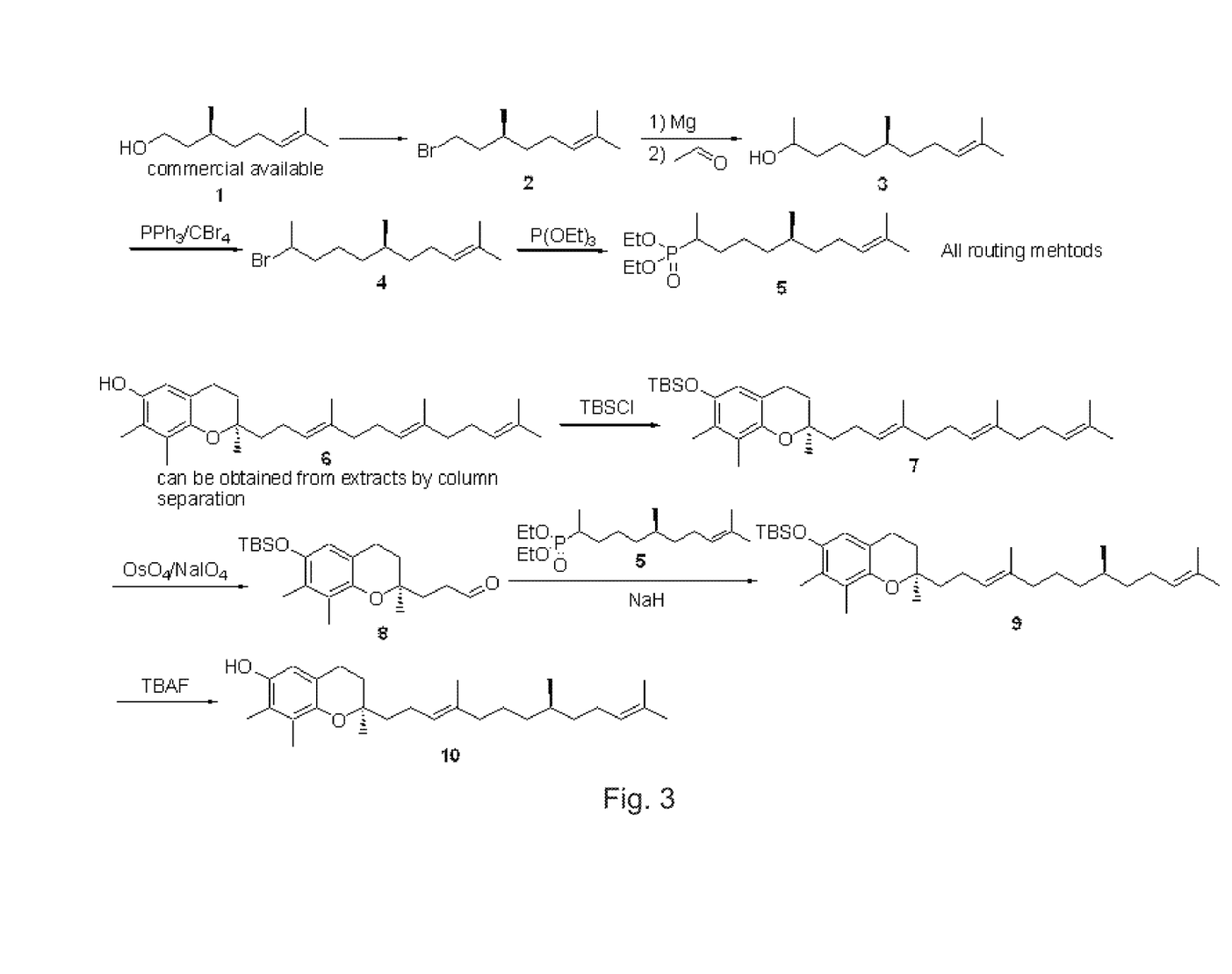
FIG. 3 is a synthetic scheme for producing a compound of the invention.

Tocoflexol a) Benzyl halide
b) Formaldehyde, methyllethylacryate
c) Lithium Hydride
d) Succinic anhydride/lipase
e) Benzyl halide and then p-toulenesulfonyl chloride
f) Phenyl phosphine, Bromine
g) Sodium methoxide
h) Ethyl diphenylphosphonoacetate
i) Lithium Hydride
j) Phenyl phosphine, Bromine
k) Mg
l) Copper lithium chloride Alternative Synthesis Scheme for Compounds of Formula I An alternative synthesis scheme to make the compounds of formula I is depicted in FIG. 3.

Ability to Monitor Tocol Levels in Samples

Figure 4:
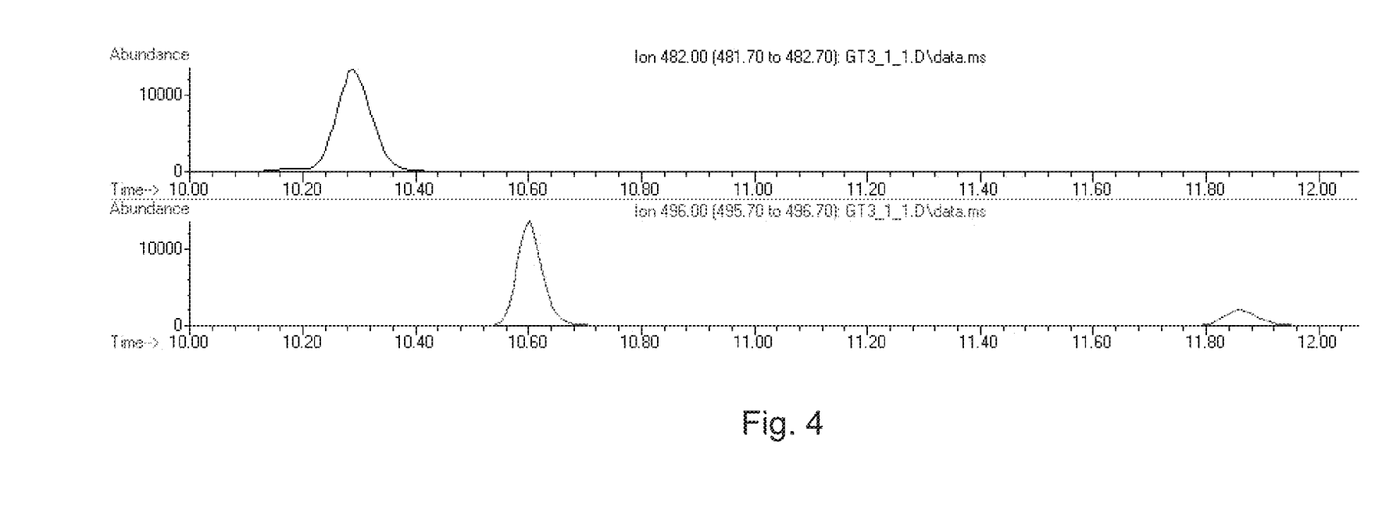
FIG. 4 is a graph showing the results of a gas chromatography-mass spectrometry experiment demonstrating the ability to detect and differentiate tocol compounds in plasma.

Gas chromatography-mass spectrometry (GC/MS) will be used to monitor tocol in plasma and other tissues of subjects treated with or administered tocols. The tracings shown in FIG. 4 demonstrate our ability to use GC/MS to differentiate and determine the presence, pharmacokinetics and bioavailability of tocols. In the top tracing γ-tocotrienol was detected and in the bottom tracing α-tocotrienol was detected. In both cases standard methods for GC/MS were used based on single-ion monitoring under electron impact conditions after the samples were derivatized using MSTFA (N-methyltrimethylsilytrifluoracetamide) as the Silylation reagent.

Tests for In Vitro Binding to αTTP

The ability of the compounds described herein to bind α-TTP will be measured as described in Panagabko et al, 2003 Biochemistry 42:6467-74. The Vitamin E activity of the compounds will be assessed by the method of Leth et al, 1977 J. Nutr. 107:2236-43. Specific activity, for example, as radioprotectors, will be assessed in vitro and in vivo using standard assays. For example, the compounds will be used in the following assays: in vitro radiation toxicity assays (clonogenic cell survival, cytogenetics, and measurement of oxidative stress) and in vivo studies (hematopoietic, gastrointestinal, pulmonary, cutaneous, and neurovascular subsyndromes of the acute radiation syndrome). We expect the compounds will offer greater radioprotection, greater Vitamin E activity and have higher affinity for αTTP as compared to tocotrienol.

The compounds described herein and α-tocopherol and α-tocotrienol will be combined with food or provided in tablet form to subjects over a period of four weeks. At various times post-administration blood samples will be harvested from the subjects and the amount of the compound present in the blood will be compared. Subjects will be tested for blood lipoprotein levels prior to receiving the compounds and after 4 weeks of treatment. After 4 weeks of treatment we expect the compounds of the invention will cause a significant reduction in the levels of lipoproteins in the blood of treated individuals as compared to untreated controls and as compared to those treated with α-tocopherol or α-tocotrienol.

We claim:

1. A method of treating a condition in a subject comprising administering an effective amount of a pharmaceutical composition to the subject,
    wherein the condition is selected from the group consisting of radiation exposure, cardiovascular disease, coronary artery disease, age-related macular degeneration, cataracts, glaucoma, chronic pain, chronic fatigue syndrome, fever, edema, diabetes mellitus, rheumatoid diseases, septic shock, and Alzheimer's disease,
    wherein the pharmaceutical composition comprises a compound selected from the group consisting of:

-continued

; and

.

2. The method of claim 1, wherein the subject is in need of treatment with an antioxidant agent, an anti-inflammatory agent, an immunoregulatory agent, an anti-thrombotic agent, an anti-atherogenic agent, a hypocholesterolemic agent or an HMG-COA reductase inhibitor.

3. The method of claim 1, wherein the condition is radiation exposure.

4. The method of claim 1, wherein the condition is cardiovascular disease.

5. The method of claim 4, wherein the treatment is effective to decrease lipoprotein levels, decrease cholesterol levels or decrease triglycerides in the subject.

6. The method of claim 1, wherein the pharmaceutical composition is in a dosage form comprising at least 50 µg of the compound per dosage form.

* * * * *